Dec. 30, 1947.  R. H. MITCHELL  2,433,816
OFFSET DISK HARROW
Filed Feb. 16, 1944  3 Sheets-Sheet 1

INVENTOR.
ROLLIE H. MITCHELL
BY
ATTORNEYS

INVENTOR.
ROLLIE H. MITCHELL
BY
ATTORNEYS

Patented Dec. 30, 1947

2,433,816

UNITED STATES PATENT OFFICE 2,433,816

OFFSET DISK HARROW

Rollie H. Mitchell, Huntington Park, Calif., assignor to Killefer Manufacturing Corporation, Los Angeles, Calif., a corporation of California Application February 16, 1944, Serial No. 522,657

11 Claims. (Cl. 55—83)

The present invention relates generally to agricultural implements and more particularly to tandem disk harrows, with particular application to those of the offset type comprising a single pair of front and rear disk gangs, which are well-known to those skilled in the art. Draft connections are provided between the drawbar of a tractor and the two disk gangs in such a manner that when the tractor is driven forwardly the disk gangs are pulled into an angled working position with the axes of the disks converging in one direction, usually toward the left. With the gangs in this position, no difficulty is encountered in making a turn to the left, but upon making a turn to the right, it is necessary to shift the gangs angularly relative to each other into a position in which the gang axes are at least parallel to each other, but preferably into a position in which the axes converge toward the right side of the implement. The force required for swinging the gangs from an angled position in one direction of convergence to an angled position in the opposite direction is obtained by means of an offset draft connection on the tractor drawbar to one end of one of the gangs, whereby a turn to the right swings the point of connection of the offset draft member forwardly, thereby applying a force in tension to the draft member and pulling the gangs out of angled working position. Under certain operating conditions, some difficulty has been encountered in making right turns, especially when it is desired to turn sharply. This difficulty arises from the failure of the gangs to swing promptly out of working position, causing the right end of the front gang to scoop into the ground, resulting in slipping of the tractor traction wheels. The principal object of the present invention, therefore, relates to the provision of an implement of this type which will promptly and easily assume a reversed angled position when the tractor is turned away from the direction of convergence of the axes of the gangs. More specifically, it is an object of my invention to provide means for urging the gangs out of working position when making a right turn. Still another object relates to the provision of means for urging the gangs out of working position when making a right turn, which means is rendered ineffective during normal working operation.

Briefly, these objects are accomplished according to the principles of the present invention, by providing a spring connected between the two gangs, which spring is stressed in normal working position to urge the gangs out of angled working position. During normal operation, the harrow is locked in angled working position to render the spring ineffective, thus preventing the gangs from slipping out of angled position during forward movement.

These and other objects and advantages of my invention will be apparent to those skilled in the art after a consideration of the following description, reference being had to the drawings appended hereto, in which Figure 1 is a plan view of an offset disk harrow embodying the principles of the present invention, and shown in a parallel or transport position.

Figure 1:
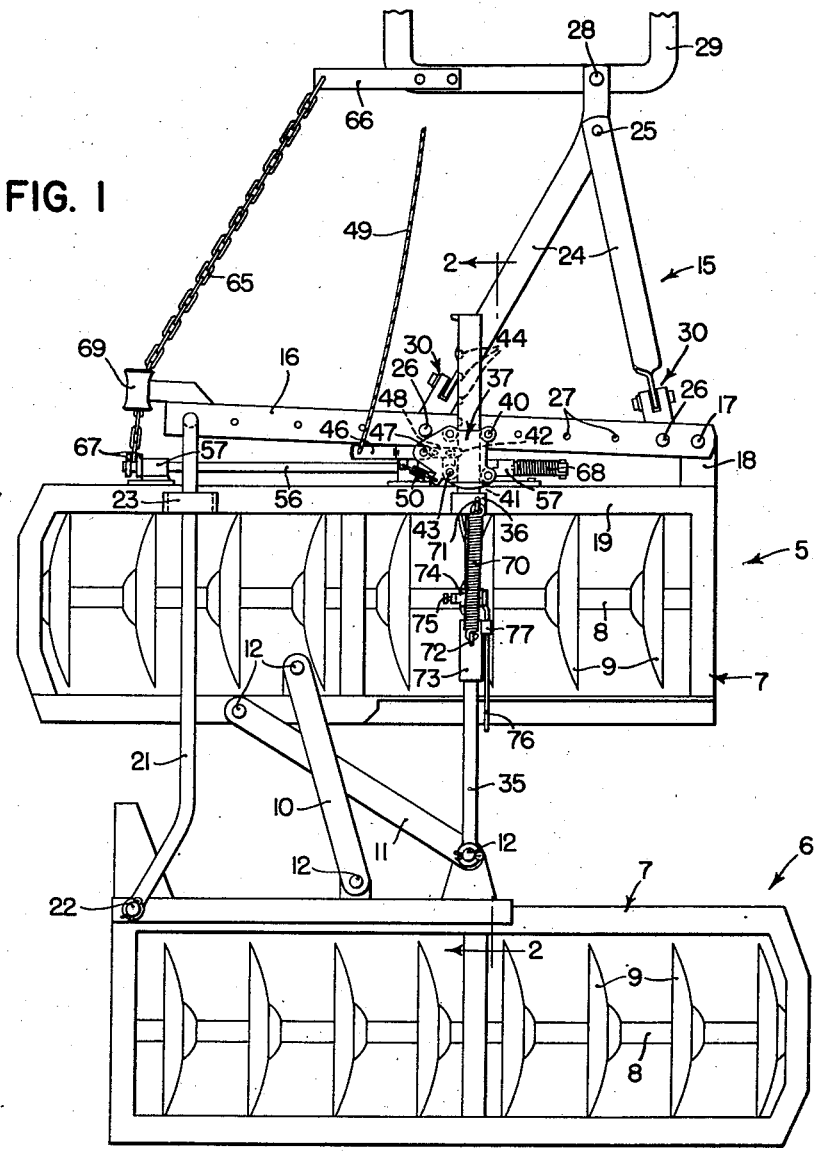

Referring now to the drawings, the harrow comprises a pair of front and rear gangs 5, 6, each comprising a generally rectangular frame 7, upon which is mounted a gang shaft 8 on which are mounted a plurality of laterally spaced disks 9, in any suitable conventional manner. The two gangs 5, 6 are swingably connected together by means of two pairs of crossed links 10, 11, each pair comprising upper and lower link bars spaced apart vertically above and below the frame members and pivotally connected thereto by means of suitable pivot pins 12.

Draft is applied to the harrow by means of a hitch frame 15, which comprises a transverse bar 16 pivotally connected by means of a pin 17 to an ear 18 fixed to the front transverse member 19 of the front gang frame 7. The opposite end of the transverse hitch bar 16 is connected by means of a pivoted link member 21 to the front left hand corner of the frame 7 on the rear gang 6. The forward end of the link member 21 is bent downwardly and passes through a suitable opening in the left hand end of the bar 16 and the link 21 extends rearwardly, lying over the top of the front gang 5 and is pivotally connected by means of a pin 22 to the rear gang frame 7. A strap member 23 is fixed to the front gang frame member 19 and lies over the link 21, permitting lateral swinging movement of the link 21 but preventing vertical displacement of the hitch bar 16 relative to the gang frame 7. The transverse hitch bar 16 is connected to a pair of forwardly converging draft members 24, which are pivotally connected together at their forward ends at 25 and are bolted to the transverse bar 16 by removable bolts 26. The draft members 24 can be adjusted laterally by removing the bolts 26 and replacing them in any of a series of holes 27 in the transverse bar 16. The forward end of one of the bars 24 is pivotally connected by means of a draft pin 28 to the U-shaped drawbar 29 of a tractor. Each of the draft members 24 is provided with a pivoted joint 30 to permit the draft members to swing vertically during operation.

The angle of convergence of the two gangs 5, 6 in operating position is controlled by angle control mechanism including an angle control bar 35, which is pivotally connected to the rear pivot pin 12 of the link 11. The angle control bar 35 extends forwardly from the pivot pin 12, and lies over the top of the front gang frame. A U-shaped strap member 36 lies over the angle control bar 35 and is rigidly fixed to the front frame member 19 of the forward gang frame, permitting the angle control bar 35 to slide fore and aft through the strap 36, but preventing lateral swinging movement of the bar 35 relative to the front gang.

Figure 3:
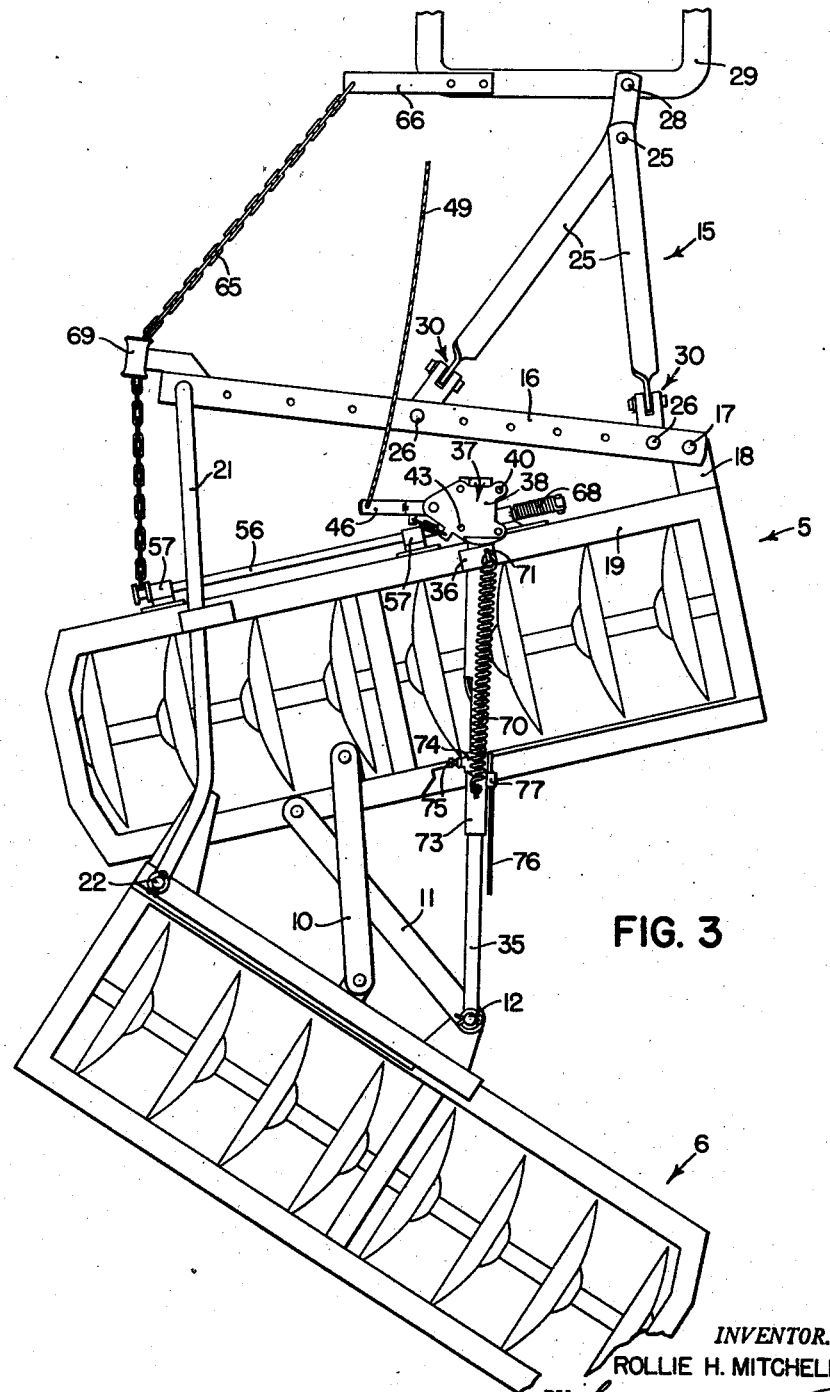
Figure 3 is a plan view of the harrow shown in a normal working position.

The harrow is pulled into angled working position by driving the tractor forwardly, thereby imposing draft upon the right end of the front gang through the pin 17, and to the left end of the rear gang through the link 21, thereby pulling the harrow into the position shown in Figure 3. This causes the angle control bar 35 to be pulled rearwardly through the strap retainer 36 and the working angle is determined by means of a latch carriage 37 which is slidable along the bar 35. The carriage 37 comprises a pair of upper and lower plates 38, 39 disposed above and below the bar 35 and secured together by bolts 40. Rollers 41 are journaled on the bolts 40 and serve as guides on opposite sides of the bar 35 to facilitate movement of the carriage 37 along the bar 35. The carriage 37 is locked in adjusted position along the bar 35 by means of a latch dog 42, which is pivotally connected to the plates 38, 39 by means of a vertical bolt 43. The latch dog 42 is engageable with any of a plurality of notches 44 in the side of the angle control bar 35, the latch dog 42 being shiftable out of engagement with the notches 44 by means of a control lever 46 pivotally connected at 47 between the plates 38, 39 and connected to the dog 42 by means of a link 48. The lever 46 is controlled from the tractor by means of a rope 49, there being a spring 50 provided to return the control lever 46 to locking position when the rope 49 is released.

Thus, as the tractor is driven forwardly to angle the harrow, the rope 49 must be pulled to unlock the carriage 37 and permit the bar 35 to slide rearwardly relative thereto. When the harrow is in the desired working angle, the operator releases the rope 49 and permits the latch dog 42 to engage the nearest notch 44, whereupon the carriage 37 is pulled into engagement with the strap member 36, thereby preventing any further rearward movement of the angle control bar 35, and thus limiting the angle of convergence between the axes of the gang shafts 8.

The gangs are also locked against angular movement out of working position by means of a latch dog 55, which is rigidly fixed to a transverse rockshaft 56, which is journaled in a plurality of bearings 57 attached to the front frame member 19 of the front gang 5. The latch dog 55 engages the front side of a projection 58 (see Figure 2), welded to the bottom of the lower plate 39 of the carriage 37. Thus, the gangs 5, 6 and bar 35 are disengageably locked against horizontal angling movement in either direction.

Figure 4:
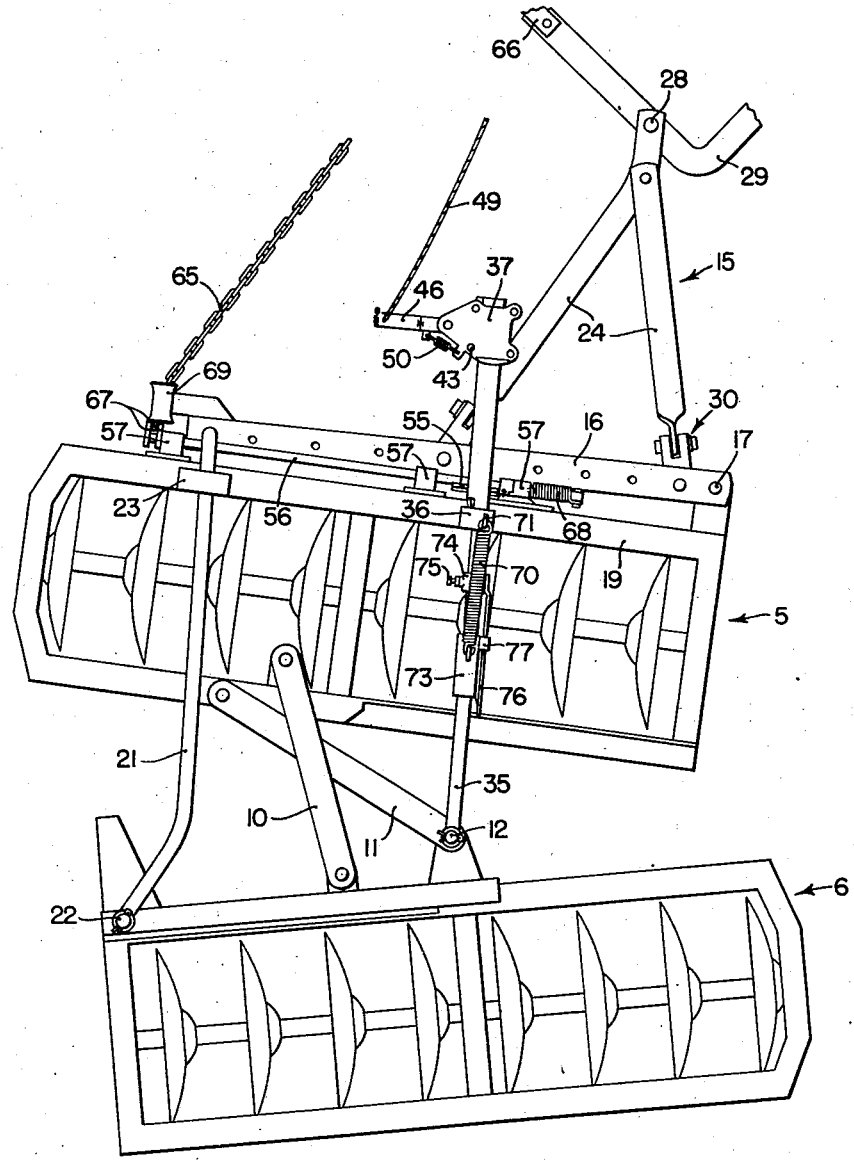
Figure 4 is a plan view showing the harrow in a right turn position.

The gangs are swung from the normal operating position shown in Figure 3, in which the gangs converge toward the left to the right turn position shown in Figure 4 in which the gangs converge toward the right, by means of a draft chain 65, which is connected at its forward end to an arm 66 which is rigidly fixed to the tractor drawbar 29 in laterally offset relation to the draft pin 28, to the left of the latter. The rear end of the chain is connected to a depending lever 67 comprising a pair of arms rigidly fixed to the rockshaft 56 at the left end of the latter and hanging downwardly therefrom. The rockshaft 56 is urged by means of a coil spring 68 encircling the right hand end of the rockshaft 56 and anchored to the adjacent rockshaft bearing 57 tending to urge the rockshaft in a clockwise direction as viewed in Figure 2, until the lower end of the lever 67 engages the front frame member 19.

Figure 2:
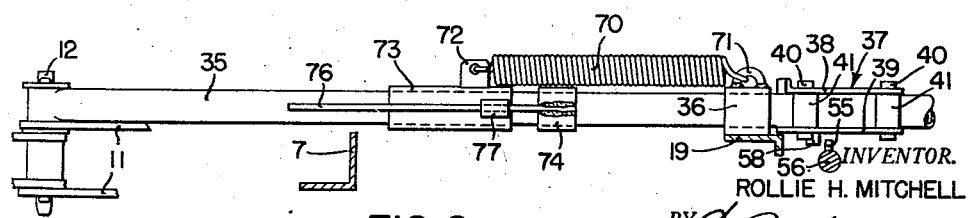
Figure 2 is an elevational view taken along a line 2—2 in Figure 1 and showing on a larger scale the details of the angle control mechanism.

When the tractor makes a right turn the drawbar 29 is swung to bring the offset arm 66 forwardly, thereby applying a forward pull through the chain 65 to the depending arm 67, until the latter is extended forwardly, thus causing the rockshaft to rotate in a counterclockwise direction as viewed in Figure 2 and forcing the latch dog 55 rearwardly past and under the projection 58, thereby permitting the angle control bar 35 to shift forwardly relative to the front gang as the draft force applied through the chain 65 pulls the left end of the front gang forwardly. At the same time, a force in compression is applied through the hitch frame 15 to the right hand end of the front gang and thus the force couple set up by the chain 65 and hitch frame 15 forces the gangs into the right turn position shown in Figure 4. This is done automatically without attention from the operator when the tractor is turned to the right. When the tractor is again straightened, the tension in the chain 65 is relaxed and the tension applied to the draft frame 15 pulls the harrow into its normal working position once more. The chain 65 is passed through a ring 69 mounted on the left end of the transverse hitch beam 16, to support the chain when the harrow is in operating position as shown in Figure 3, to prevent the chain from dragging on the ground.

Further details of construction and operation of the control mechanism in a harrow of this general type is contained in Patent No. 2,169,471, granted August 15, 1939, to Sjogren and myself.

A heavy tension coil spring 70 is connected at its forward end to an eye 71 welded to the top of the strap member 36, and is connected at its rear end to a lug 72 rigidly fixed as by welding to the top of a sleeve 73. The sleeve 73 is slidably disposed upon the angle control bar 35 and is free to slide longitudinally thereof. A collar 74 embraces the angle control bar 35 ahead of the sleeve 73 and is provided with a set screw 75 for rigidly securing the collar 74 to the bar 35 in any desired position of adjustment. The sleeve 73 is prevented from rotating relative to the bar 35 by means of a rod 76, which is rigidly attached, as by welding to the collar 74 and extends rearwardly therefrom alongside the sleeve 73 and through a small collar or thimble 77 which is rigidly fixed to the side of the sleeve 73. Thus, the sleeve 73 is free to slide longitudinally along the angle control bar 35 but is held in a position with the lug 72 uppermost by means of the thimble 77 and rod 76, and it is also limited in its forward movement relative to the bar 35 by means of the fixed collar 74.

It is now evident that when the tractor is driven forwardly to angle the harrow, the spring is stressed in tension as soon as the sleeve 73 is pulled into engagement with the fixed collar 74. After the angle between the gangs has been determined by the operator releasing the rope 49 and causing the latch dog 42 to engage one of the notches 44, the spring 70 is prevented from pulling the gangs back to a lesser angle, by virtue of the interengaging latch members 55, 58 on the shaft 56 and carriage 37, respectively. Thus, during operation, the harrow maintains its adjusted angle of convergence until the tractor makes a right turn, which releases the latch dog 55 as explained above, rendering the spring 70 effective to assist the draft chain 65 in promptly swinging the gangs to a reverse angled position to facilitate the right turn, as indicated in Figure 4. In this position, it will be noted that the sleeve 73 is shifted rearwardly along the bar 35 away from the fixed sleeve 74, rather than buckling the spring as would be the case if the spring were connected directly to the collar 74. When the tractor is straightened once more, the right hand ends of the gangs are spread apart, thereby taking up the lost motion between the sleeve 73 and collar 74 and then stretching the spring 70, as shown in Figure 3.

The spring 70 also facilitates closing the harrow to parallel position for purposes of transport, which is accomplished by pulling the rope 49 and backing the tractor against the draft frame 15, thereby pushing the right hand end of the front gang rearwardly, thereby returning the harrow to the position shown in Figure 1. During this operation, the carriage 37 is locked to the front gang frame by means of the latch dog 55 on the rockshaft 56, whereby the rearward movement of the front gang relative to the rear gang causes the angle control bar 35 to slide forwardly through the carriage 37.

I claim:

1. In an implement comprising a pair of front and rear gangs of ground working tools swingably connected together by means providing for relative angular movement in a generally horizontal plane into and out of angled working position and draft means connected to said front and rear gangs and adapted to be coupled to a tractor, a tension coil spring connected at one end to one of said gangs, a lost motion connection between the other end of said spring and the other gang in laterally offset relation to the swingable connection between the gangs, said lost motion connection being disengaged when the gangs are in a parallel transport position to prevent the spring from buckling but engageable as the gangs are moved toward working position, said spring being adapted to be stressed by movement of said gangs into said angled working position, the force of said spring acting to urge said gangs out of said working position.

2. In an implement comprising a pair of front and rear gangs of ground working tools swingably connected together by means providing for relative angular movement in a generally horizontal plane into and out of angled working position and draft means connected to said front and rear gangs and adapted to be coupled to a tractor, a tension coil spring connected at one end to one of said gangs, and means for adjustably connecting the other end of said spring with the other of said gangs at various distances from said one end to increase or decrease the spring pressure between said gangs, said springs being connected in laterally offset relation to said swingable connection to stress said spring by movement of said gangs into said angled working position, the force of said spring acting to urge said gangs out of said working position, said adjustable connecting means including lost motion means preventing said spring from buckling when said gangs are closed into parallel transport position.

3. In an implement comprising a pair of front and rear gangs of ground working disks swingably connected together by means providing for relative angular movement in a horizontal plane between a parallel non-working position and an angled working position, means for controlling said angular movement comprising an angle control bar pivotally connected to one of said gangs and slidable generally fore and aft relative to the other gang, a spring connected at one end to the last mentioned gang and a lost motion connection between the other end of said spring and said bar, said spring being so connected as to be stressed by movement of said gangs into angled position, to urge said gangs toward said non-working position and said lost motion connection being adapted to separate when said gangs are in said non-working position to prevent the spring from buckling.

4. In an implement comprising a pair of front and rear gangs of ground working disks swingably connected together by means providing for relative angular movement in a horizontal plane between a parallel non-working position and an angled working position, and means for controlling said angular movement comprising a longitudinally extending bar adjustably interconnecting said gangs, a sleeve slidable on said bar, spring means connected between said sleeve and one of said gangs, and means for adjustably connecting said sleeve to said bar in various longitudinally spaced positions thereon.

5. In an implement comprising a pair of front and rear gangs of ground working disks swingably connected together by means providing for relative angular movement in a horizontal plane between a parallel non-working position and an angled working position, and means for controlling said angular movement comprising a longitudinally extending bar pivotally connected to one of said gangs, disengageable means for locking said gangs and said bar in a horizontally rigid structure, a sleeve slidable along said bar, means for adjustably connecting said sleeve with said bar at various points therealong, and a spring connected between said sleeve and the other of said gangs and effective upon disengagement of said locking means, for urging said gangs from said angled position toward said non-working position.

6. In an implement comprising a pair of front and rear gangs of ground working disks swingably connected together by means providing for relative angular movement in a horizontal plane between a parallel non-working position and an angled working position, means for controlling said angular movement comprising a longitudinally extending angle control bar having one end pivotally connected to one of said gangs, means for disengageably locking the other end of said bar to the other of said gangs, a sleeve slidable along said bar, means for connecting said sleeve to said bar in longitudinally adjusted position, and a spring connected between said sleeve and the other of said gangs and effective upon disengagement of said locking means, for urging said gangs from said angled position toward said non-working position.

7. In an implement comprising a pair of front and rear gangs of ground working tools swingably connected together by means providing for relative angular movement in a generally horizontal plane into and out of angled working position and draft means connected to said front and rear gangs for transmitting a forward draft force to pull said gangs into said angled working position and adapted to transmit a draft force in an angle in one direction to close said gangs to said non-working position, a longitudinally extending angle control bar having one end pivotally connected to one of said gangs, means for disengageably locking the other end of said bar to the other of said gangs to lock said gangs, draft connections, and control bar in a horizontally rigid structure, a sleeve slidable along said bar, means for connecting said sleeve to said bar in longitudinally adjusted position, and a spring connected between said sleeve and said other gang, said spring being stressed by movement of said gangs into said working position and effective, upon disengagement of said locking means, for urging said gangs toward said non-working position.

8. In an implement comprising a pair of front and rear gangs of ground working disks swingably connected together by means providing for relative angular movement in a horizontal plane between a parallel non-working position and an angled working position, means for controlling said angular movement comprising a longitudinally extending bar interconnecting said gangs and shiftable relative to one of the latter, a sleeve slidable on said bar, spring means connected between said sleeve and said one of said gangs, and a stop collar fixed to said bar against which said sleeve abuts when the gangs are shifted toward working position, providing a lost motion connection separable when said gangs are shifted to non-working position to prevent buckling of the spring.

9. In an implement comprising a pair of front and rear gangs of ground working disks swingably connected together by means providing for relative angular movement in a horizontal plane between a parallel non-working position and an angled working position, means for controlling said angular movement comprising a longitudinally extending bar interconnecting said gangs and shiftable relative to one of the latter, a sleeve slidable on said bar, spring means connected between said sleeve and said one of said gangs, a stop collar slidable on said bar, and means for fixing said collar to said bar in longitudinally adjusted position, said collar acting as an abutment against which said sleeve bears to stress said spring when the gangs are shifted toward said working positions, the tension in said spring being adjustable by adjusting said collar on said bar.

10. In an implement comprising a pair of front and rear gangs of ground working disks swingably connected together by means providing for relative angular movement in a horizontal plane between a parallel non-working position and an angled working position, means for controlling said angular movement comprising a longitudinally extending bar interconnecting said gangs and shiftable relative to one of the latter, a sleeve slidable on said bar, spring means connected between said sleeve and said one of said gangs, a stop collar slidable on said bar, means for fixing said collar to said bar in longitudinally adjusted position, said collar acting as an abutment against which said sleeve bears to stress the spring when said gangs are shifted toward said working position, the tension in said spring being adjustable by adjusting said collar on said bar, and cooperable guide means on said collar and on said sleeve for preventing rotation of the latter relative to said bar.

11. In an implement comprising a pair of front and rear gangs of ground working tools swingably connected together by means providing for relative angular movement in a generally horizontal plane into and out of angled working position and draft means connected to said front and rear gangs for transmitting a forward draft force to pull said gangs into said angled working position and adapted to transmit a draft force in an angle in one direction to close said gangs to said non-working position, a longitudinally extending angle control bar having one end pivotally connected to one of said gangs, means for disengageably locking the other end of said bar to the other of said gangs to lock said gangs, draft connections, and control bar in a horizontally rigid structure, a sleeve slidable along said bar, means for connecting said sleeve to said bar in longitudinally adjusted position, and a spring connected between said sleeve and said other gang, said spring being stressed by movement of said gangs into said working position and effective, upon disengagement of said locking means, for urging said gangs toward said non-working position, said sleeve connecting means comprising a stop collar fixed to said bar against which said sleeve abuts when the gangs are shifted toward working position, providing a lost motion connection separable when said gangs are shifted to non-working position to prevent buckling of the spring.

ROLLIE H. MITCHELL.

REFERENCES CITED

The following references are of record in the file of this patent:

UNITED STATES PATENTS

| Number | Name | Date |
|---|---|---|
| 1,710,124 | Traphagen | Apr. 23, 1929 |
| 1,832,027 | Johnson | Nov. 17, 1931 |
| 2,169,471 | Mitchell | Aug. 15, 1939 |